United States Patent Office 2,977,802
Patented Apr. 4, 1961

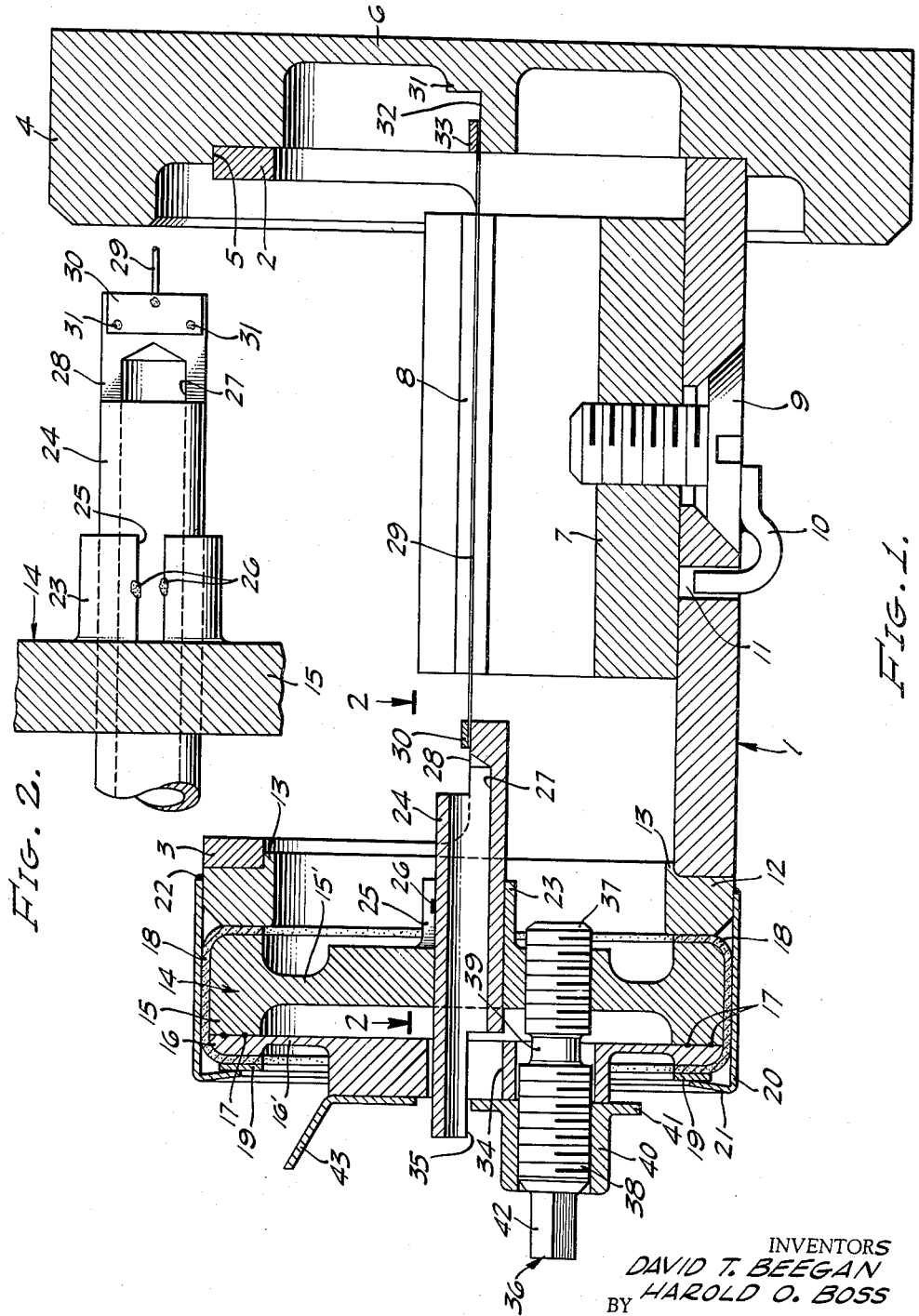

2,977,802

DIFFERENTIAL ADJUSTMENT FOR PRECISION INSTRUMENTS

David T. Beegan, Pasadena, and Harold O. Boss, Costa Mesa, Calif., assignors to Borg-Warner Corporation, Chicago, Ill., a corporation of Illinois Filed May 28, 1957, Ser. No. 662,065

6 Claims. (Cl. 73—432)

The present invention relates to differential adjustment means for precision instruments, and more particularly to means for effecting a compound differential adjustment.

The adjustment of compressive or tensile strains or stresses of an element such as a bar, wire, filament, or the like, is extremely difficult unless a coarse adjustment can be translated into a fine adjustment as by the use of screw threads, diaphragms, or the like. Such difficulties are encountered, by way of example, in adjusting the tension of a vibratory wire in gages such as that disclosed in U.S. Patent No. 2,447,817.

In such vibrating wire devices, the vibration frequency of the wire is varied by adjusting the tension of the wire. A relatively minute change in tension of such a wire will substantially alter its vibration frequency. This variable vibration characteristic of the wire is employed to reflect a variation in the characteristic of a variable being measured. However, it is essential that the wire be initially stressed to a precise degree.

Accordingly, it is an object of the present invention to provide a device for effecting extremely fine stress adjustment of a vibratory wire, or the like, as the result of making a relatively coarse adjustment manually.

Another object is to provide an extremely fine tension adjuster for precision setting of the vibratory wire of a vibrating wire device. This objective is attained by the provision of compound differential adjuster means.

A further object is to provide means for adjusting the tension of a wire or other strand or strip by the use of a differential pitch or lead screw device.

Still another object is to provide means for adjusting the tension of a wire, strand or other strip, including a pair of diaphragms or other flexible members having different characteristics of flexure. In this connection, the wire or other element to be adjusted is connected to a first diaphragm or flexible member, and adjuster means are employed to act on the other diaphragm or flexible member and upon the first diaphragm or flexible member to effect relative movement of the diaphragms or flexible members. Because of the different flexure characteristics of the diaphragms or flexible members, the total adjustment of the wire, strand, or other strip will be only the difference in the flexure of the two diaphragms or flexible members. For example, if a pair of diaphragms having a differential stiffness ratio of 10:1 are employed, the more flexible diaphragm will flex 10 times more than the less flexible one. Therefore, if the overall adjustment of the two diaphragms be .01″, the less flexible diaphragm will be moved only .001″, while the rest of the movement is absorbed in the more flexible diaphragm. A differential adjustment would be effected even if the diaphragms were balanced, in that each diaphragm would flex only one-half of the total adjustment. Accordingly, since the member to be adjusted may be acted upon by either diaphragm, the ultimate adjustment of such member will be in the ratio that the diaphragm, with which it is connected or engaged, bears to the whole, whether the adjustment is in compression or tension.

Obviously, there are practical limitations in the fineness of adjustment which may be accomplished by the use of differentially acting diaphragms or other flexible members. However, in accordance with another objective, a further differential adjustment is effected; namely, a differential action in the means for relatively flexing the diaphragms: for example, mounting a single differentially threaded screw in both diaphragms or flexible members so that threads of different pitches and the same lead, engaging the respective diaphragms or flexible members, will produce for each rotation of the screw relative movement of the diaphragms or flexible members equal to the difference in the pitch of the threads.

Therefore, if a differential screw having threaded sections of .0138″ pitch per revolution and .0125″ pitch per revolution, respectively, is employed, the total adjustment is .0013″ per revolution. Combining this with the differential diaphragm or flexible member characteristics of a 10:1 ratio, it is seen that the total adjustment of either tension or compression of the wire, strand or strip would be only 1/10 of .0013″ per revolution of the screw, or .00013″.

Other objects and advantages of the invention will be hereinafter described or will become apparent to those skilled in the art, and the novel features thereof will be defined in the appended claims.

In the accompanying drawing:

Fig. 1 is a longitudinal sectional view taken axially through a vibrating wire device embodying the invention; and Fig. 2 is an enlarged fragmentary view partly in plan and partly in section, as taken on the line 2—2 of Fig. 1.

Like reference characters in the drawing and in the following description designate corresponding parts.

The device hereof generally comprises a frame member 1 which is generally semi-cylindrical in form having annular ends 2 and 3.

Disposed upon the annular end 2 is a head member 4 which is provided with an annular seat 5 for receiving the end 2. Centrally, the head 4 is so formed as to constitute a flexible diaphragm 6 for a purpose which will hereinafter become apparent.

Intermediate its ends, the frame member 1 has affixed thereto a magnet 7 of symmetrical formation having upstanding poles 8. The magnet 7 is secured in the base of the member 1 by means of a counter-sunk screw 9, this screw being locked in place after tightening by means of welding thereto a tab 10 which projects into a socket 11 in the member 1. At the other end of the member 1 is an adapter ring 12 having an axially extended inner peripheral flange 13 disposed within the annulus 3. In axially aligned abutting contact with the ring 12 is a diaphragm assembly 14, including an inner flexible member or metal disc or diaphragm 15 and an outer flexible member or metal disc or diaphragm 16, of annular form, joined together adjacent to their outer peripheries as by spot welding at 17.

The diaphragm assembly 14 is enclosed about its outer margin in an annular insulating shell 18 of ceramic or other suitable material, this shell being generally U-shaped in cross-section and extending radially between the diaphragm assembly 14 and the ring 12, at the inner side of the diaphragm assembly, and between said assembly 14 and a washer 19 at its outer side. An annular shell 20, having a radially inwardly projecting terminal flange 21, is disposed about the assembly 14 with the flange 21 engaging the washer 19. The shell 20 is preferably welded at its inner end to the ring 12 in a suitable number of circumferentially spaced locations, as at 22.

Extending axially inwardly at the center of diaphragm 15 is a hub 23, the diaphragm 15 and the hub 23 thereon being axially bored to receive a compensator pin or member 24. The hub 23 is longitudinally slotted at 25, and the pin 24 is preferably secured in the hub 23 by welding in the slot as at 26. The member 24 is bored axially at 27 and at its inner end is milled to provide a transversely extended shoulder or seat 28. One end of a longitudinally extended vibratory wire, strand or other strip-like element 29 is secured upon the shoulder 28 as by means of a clamping plate 30 which is secured as by spot welding at 31 to the shoulder 28. At its other end, the wire or other vibratory element 29 is secured at the axis of the diaphragm 6. For this purpose, the diaphragm 6 is provided with an axially extended boss 31 having a seat 32 on which this end of the element 29 is secured by a clamping plate 33 similar to clamping plate 30 previously described. The pin 24 may project axially through the outer diaphragm 16 upon assembling, and, accordingly, the diaphragm 16 has a central opening 34 therethrough. Additionally, in order to afford clearance space, the outer end of pin 24 is preferably milled as at 35.

An adjuster means is provided for effecting adjustment of the diaphragms 15 and 16 towards and away from one another. This adjuster means includes an element 36 providing means engageable with the respective diaphragms for effecting relative flexure thereof. Preferably, the member 36 has a threaded end 37 engaged in a complementally threaded opening extending parallel to the axis of the diaphragm 15 in slightly radially spaced relation to said axis. Adjacent the other end of the member 36, is a threaded section 38 which is separated from the threaded end 37 by a reduced stem section 39. Threadedly mounted on the screw section 38 is a coarse adjuster nut 40 having a base flange 41 engageable with the outer surface of the flexible member or diaphragm 16. Subsequent to making a coarse adjustment of the nut 40 during assembly, this nut is welded to the diaphragm 16 so as to constitute a relatively stationary member in which the threaded section 38 of member 36 is adjustably disposed. In order to effect rotation of the member 36, it is preferably provided with a means at its outer end, such as a square or hexagonal stem 42, for engagement by a tool.

In the use of a vibrating wire device such as that illustrated herein, the diaphragm 6 is adapted to be subjected to variations in a variable to be measured. Therefore, the device may be employed in fluid pressure, temperature, or flow measuring devices, wherein the diaphragm 6, or some equivalent axially moveable support for a vibratory element, is caused to move responsive to such variations.

Variations in the natural vibrating frequency of the wire 29 in the magnetic field between the poles 8 of the magnet are, of course, effected by varying the tension of the wire. Therefore, since the wire 29 is in an electrical circuit with a contact member 43 secured to the outer face of the diaphragm 16, through the metallic diaphragms 15, 16, the pin 24 and head member 4, the head member 4 and the contact member 43 may be interposed in an appropriate amplifier circuit of a measuring, testing, or other system, as is well known in the art.

However, it is important to effective operation of the system that the tension of the vibratory wire or other member be properly adjusted initially, since very minute changes in tension cause relatively great changes in the natural vibration frequency of the wire. Fine adjustment, then, is necessary to enable proper calibration of the device, but fine adjustment is difficult to attain unless it can be accomplished by virtue of a relatively coarse adjusting movement.

Accordingly, it will be noted that diaphragm 15 is relatively thick axially and is provided with a thinner flexible section 15' intermediate its peripheries, while the diaphragm 16 has a much thinner flexible section 16' intermediate its peripheries. Preferably, the comparative thicknesses of diaphragm sections 15' and 16' are such that diaphragm 16 flexes 10 times as much as diaphragm 15, thus providing a differential of 10:1 in their characteristics of flexure under similar conditions. Of course, without departing from the invention, different types of flexible members other than diaphragms may be employed, and the differential may vary from 1:1 upwards to the practical limit.

Thus, it will be seen that rotation of member 36 will effect relative flexure of the diaphragms 15 and 16, say in a ratio of 10:1. Since the wire 29 is connected to diaphragm 15 which moves only one-tenth as far as diaphragm 16, coarse adjustment of the diaphragms will effect relatively fine adjustment of the wire tension.

In order to render such tension adjustment much finer than is possible by differential diaphragm flexure, the threaded sections 37 and 38 of member 36 are preferably formed with threads of the same hand and different pitch or lead angles. In this way, the effective relative flexure of the diaphragms per revolution of member 36 will be the difference between the thread pitches. Thus, if threaded sections 37 and 38 are respectively provided with threads having a pitch or lead of .0125" and .0138", the net lead will be .0013" per revolution. However, since diaphragm 15 will move, for example, only one-tenth as much as diaphragm 19, a screw having such thread pitch differential will effect only .00013" movement of diaphragm 15, this being an extremely fine adjustment of the tension of the wire 29 responsive to a coarse full revolution of the member 36. Obviously then, if the member 36 were rotated one-quarter of a revolution, which would be a simple operation, the net adjustment of the wire 29 would be a mere .0000325".

Thus, it will be seen that improved, novel means are provided for effecting compound differential adjustment of an element which is operatively connected to an adjustable support, this means including an adjustable assembly having a pair of differentially flexible members 15 and 16 with said support carried by one of the flexible members, and differentially operative means 36 engageable with the flexible members for effecting their relative movement.

While the specific details of the invention have been herein shown and described, changes and alterations may be resorted to without departing from the spirit thereof as defined in the appended claims.

In the ensuing claims, where the term "differentially moveable" or "differentially flexible" or similar language is employed, it is to be understood that such language, unless specifically qualified, is intended to embrace relatively moveable members having the same characteristics, as well as different characteristics, of flexure or movement; that is, the ratio of relative movement may be 1:1 upwards through 10:1 or higher, as may be limited by practical considerations.

We claim:

1. A mechanism for effecting extremely small changes in the stress of a given member, comprising in combination, a first flexible diaphragm having a portion fixed relative to one portion of said given member, a second flexible diaphragm, and an adjustment member formed with first and second portions adjustably engaging respectively said first and second diaphragms, said first and second portions being fixed with respect to each other for unitary operation with adjustment of said adjustment member and being so formed that a given adjustment operation of said adjustment means effects relative movement of said first and second portions with respect to said first and second diaphragms respectively in the same direction but by a slightly different amount for effecting relative flexing movement thereof and causing the difference in the forces of flexure thereof to be transmitted to said given member for changing the stress thereof, whereby a given adjustment operation of said adjustment member effects relatively small relative movement of said diaphragms for effecting an extremely small change in the difference in the flexure forces thereof and hence an extremely small change in the stress of said given member.

2. A mechanism for effecting extremely small changes in the stress of a given member, comprising in combination, a first flexible diaphragm having a stationary portion and a flexible portion fixed relative to a portion of said given member, a second flexible diaphragm having a stationary portion and a flexible portion, and an adjustment member formed with first and second portions adjustably engaging respectively the flexible portions of first and second diaphragms, said first and second portions being fixed with respect to each other for unitary operation with adjustment of said adjustment member but having different mechanical advantages in the respective cooperation with the flexible portions of said diaphragms for effecting relative movement thereof and causing the difference in the forces of flexure thereof to be transmitted to said given member for changing the stress thereof, whereby a given adjustment operation of said adjustment member effects relatively small relative movement of the flexible portions of said diaphragms for effecting an extremely small change in the difference in the flexure forces thereof and hence an extremely small change in the stress of said given member.

3. A mechanism for effecting extremely small changes in the stress of a given member, comprising in combination, a first flexible diaphragm having a portion fixed relative to one portion of said given member, a second flexible diaphragm, and an adjustment member comprising first and second threaded portions engaging respectively said first and second flexible diaphragms for effecting relative flexing movement thereof and causing the difference in the forces of flexure thereof to be transmitted to said given member for changing the stress thereof, said threaded portions having threads of the same hand but of minutely different pitches whereby a given adjustment operation of said adjustment member effects relatively small relative movement of said first and second diaphragms for effecting an extremely small change in the difference in the flexure forces thereof and hence an extremely small change in the stress of said given member.

4. A mechanism for effecting changes in the stress of a given member, comprising in combination, a first flexible diaphragm having a portion fixed relative to one portion of said given member, a second flexible diaphragm, and an adjustment member comprising first and second threaded portions engaging respectively said first and second flexible diaphragms for effecting relative flexing movement thereof and causing the difference in the forces of flexure thereof to be transmitted to said given member for changing the stress thereof.

5. A mechanism for effecting changes in the stress of a given member, comprising in combination, a first flexible diaphragm having a portion fixed relative to one portion of said given member, a second flexible diaphragm, and an adjustment member comprising first and second threaded portions engaging respectively said first and second flexible diaphragms for effecting relative flexing movement thereof and causing the difference in the forces of flexure thereof to be transmitted to said given member for changing the stress thereof, said threaded portions having threads of the same hand whereby a given adjustment operation of said adjustment member effects relatively smaller change in the stress of said given member.

6. A mechanism for effecting extremely small changes in the tension of a wire one end of which is stationary, comprising in combination, a first flexible diaphragm having a portion fixed relative to the other end of said wire, a second flexible diaphragm, and an adjustment member comprising first and second threaded portions engaging respectively said first and second flexible diaphragms for effecting relative flexing movement thereof and causing the difference in the forces of flexure thereof to be transmitted to said wire for changing the tension thereof, said threaded portions having threads of the same hand but of minutely different pitches whereby a given adjustment operation of said adjustment member effects relatively small relative movement of said first and second diaphragms for effecting an extremely small change in the difference in the flexure forces thereof and hence an extremely small change in the tension of said wire.

References Cited in the file of this patent
UNITED STATES PATENTS

| | | |
|---|---|---|
| 459,414 | Robinson | Sept. 15, 1891 |
| 2,125,005 | Jearum | July 26, 1938 |
| 2,319,011 | Meredith | May 11, 1943 |
| 2,485,280 | Grace | Oct. 18, 1949 |
| 2,604,787 | Coyne et al. | July 29, 1952 |
| 2,693,699 | Federn | Nov. 9, 1954 |